US009796391B2

(12) United States Patent
Olson et al.

(10) Patent No.: US 9,796,391 B2
(45) Date of Patent: Oct. 24, 2017

(54) DISTRACTED DRIVER PREVENTION SYSTEMS AND METHODS

(71) Applicant: Verizon Patent and Licensing Inc., Arlington, VA (US)

(72) Inventors: Brian Olson, Clayton, CA (US); Steven R. Rados, Danville, CA (US); Kent W. Hughes, Oakland, CA (US); Kumar Sanjeev, San Ramon, CA (US); Donna L. Polehn, Kirkland, WA (US); David Chiang, Fremont, CA (US); Nithya Krishnaswamy, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 187 days.

(21) Appl. No.: 14/512,856

(22) Filed: Oct. 13, 2014

(65) Prior Publication Data

US 2016/0101784 A1     Apr. 14, 2016

(51) Int. Cl.
*G08B 23/00*     (2006.01)
*B60W 40/08*    (2012.01)
*B60K 35/00*     (2006.01)

(52) U.S. Cl.
CPC ............. *B60W 40/08* (2013.01); *B60K 35/00* (2013.01)

(58) Field of Classification Search
CPC ............................... B60W 40/09; B60K 35/00
USPC .......................................................... 340/576
See application file for complete search history.

(56) References Cited

U.S. PATENT DOCUMENTS

| | | | | |
|---|---|---|---|---|
| 8,799,994 | B2* | 8/2014 | Barton | H04L 67/10 726/1 |
| 2005/0234617 | A1* | 10/2005 | Kynast | G01C 21/3641 701/36 |
| 2006/0168627 | A1* | 7/2006 | Zeinstra | H04M 1/6091 725/75 |
| 2010/0210254 | A1* | 8/2010 | Kelly | G07C 5/008 455/418 |
| 2010/0222976 | A1* | 9/2010 | Haug | B60K 28/04 701/70 |
| 2010/0238009 | A1* | 9/2010 | Cook | G06Q 10/10 340/439 |
| 2011/0298829 | A1* | 12/2011 | Stafford | G06K 9/3208 345/659 |
| 2012/0176232 | A1* | 7/2012 | Bantz | G07C 5/008 340/439 |

(Continued)

*Primary Examiner* — Hai Phan
*Assistant Examiner* — Royit Yu

(57) ABSTRACT

A user device may be used to prevent a user from driving a vehicle while distracted by the user device. The user device may create a user profile, determine whether the user is driving, and collect usage data while the user is driving. The user profile may include information regarding the driver's propensity to be distracted while driving and the usage data may include information on whether the user is actually distracted by the user device. The user device may determine whether the driver is distracted based on the user profile and the usage data, and may respond in one or more ways, such as by alerting the driver with an audio signal, disabling a feature of the user device, logging instances of user distraction with a diagnostics device, activating a braking system of the vehicle, warning nearby drivers about the driver being distracted, and more.

20 Claims, 15 Drawing Sheets

(56) References Cited

U.S. PATENT DOCUMENTS

| | | | |
|---|---|---|---|
| 2013/0046562 A1* | 2/2013 | Taylor | G06Q 40/00 705/4 |
| 2013/0190045 A1* | 7/2013 | Kulas | G06F 3/041 455/556.1 |
| 2013/0210406 A1* | 8/2013 | Vidal | H04W 4/00 455/418 |
| 2013/0281079 A1* | 10/2013 | Vidal | H04W 8/22 455/418 |
| 2013/0335401 A1* | 12/2013 | Beckmann | B60K 35/00 345/418 |
| 2015/0266484 A1* | 9/2015 | Moran | B60W 40/08 340/576 |

* cited by examiner

DISTRACTED DRIVER PREVENTION SYSTEMS AND METHODS

BACKGROUND

Cars, trucks, trains, and other types of vehicles are a ubiquitous feature of modern society because of the significant social and economic benefits that they provide. However, the use of such vehicles can pose a danger to people and property when operated under dangerous conditions, such as when a driver of a vehicle is operating a user device (such as a mobile telephone) to send and receive text messages, browse the Internet, view pictures, watch videos, configure settings of the user device, etc.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for preventing a user of a user device (e.g., a mobile telephone) from driving a vehicle (e.g., a car, a truck, a bus, etc.) while being distracted by the user device. Information, such as whether the user device is being used, how the user device is being used, whether the user is viewing the user device, and other types of information, may be gathered and analyzed to determine whether the user is distracted by the user device while driving, and a response may be executed to prevent the user from driving while distracted, such as alerting the user with an audio warning, deactivating the user device, activating a braking system of the vehicle, activating an assisted driving mode of the vehicle (e.g., where the vehicle is capable of driving on its own), contacting a guardian of the user, an employer of the user, and/or law enforcement, etc.

Figure 1:
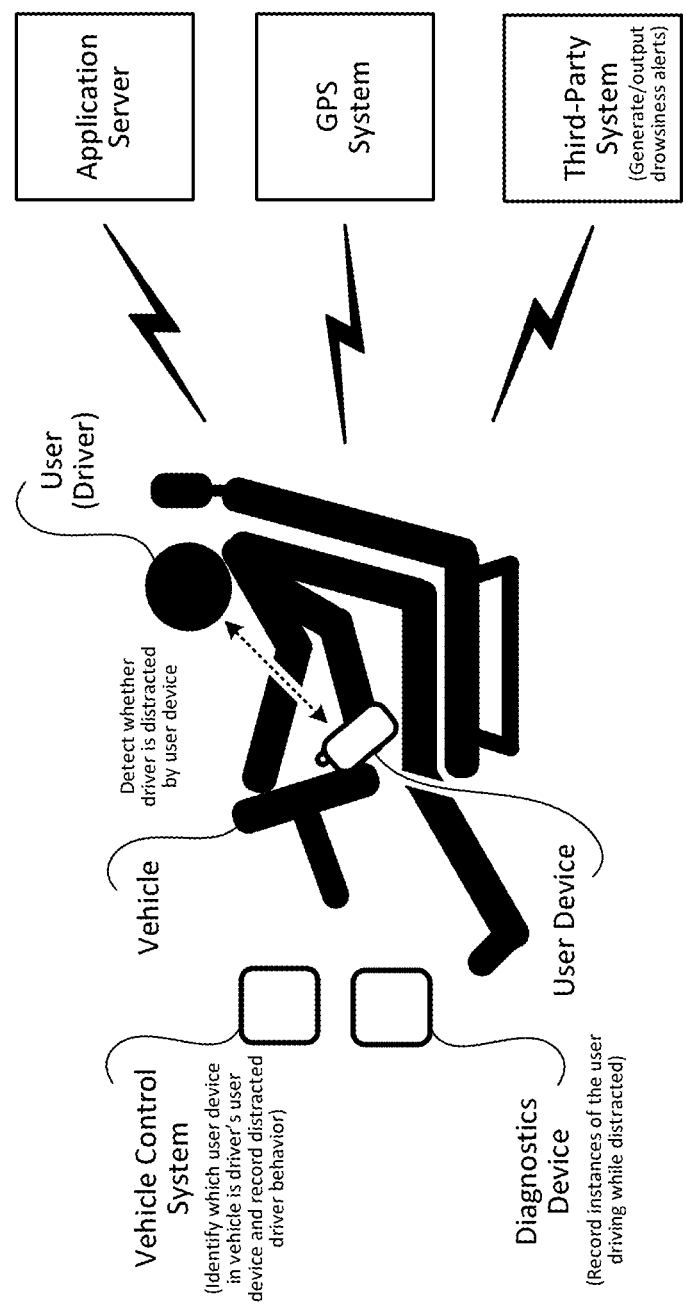
FIG. 1 illustrates an example overview of an implementation described herein.

FIG. 1 illustrates an example overview of an implementation described herein. As shown in FIG. 1, a user may have a user device (e.g., a smartphone, a tablet computer, etc.) while driving a vehicle. The user device may create a user profile for the user, which may include receiving profile information directly from the user and/or communicating with an application server to obtain profile information. The user profile may include information indicating whether the user is likely to drive while distracted, what types of conditions (e.g., particular routes, times of day, days of the week, etc.) tend to contribute to the user driving while distracted, what types of user device orientations are associated with the user being distracted by the user device while driving, and/or what types of behaviors (e.g., the user glancing at the user device, etc.) the user may exhibit while being distracted by the user device, what types of processes (e.g., text messaging) are associated with distracting the user, etc. The user profile may also, or alternatively, include information from one or more other users that are analogous (e.g., an age, a behavior, etc.) to the user.

The user device may determine whether the user is actually driving the car by determining whether the user is sitting in a driver's seat of a vehicle and/or by determining whether the vehicle is moving. For instance, to determine whether the user is sitting in a driver's seat of the vehicle, the user device may capture image data (e.g., a seat belt, a steering wheel, a gear shifter, etc.) indicative of the user sitting in the driver's seat and/or may communicate with a diagnostics device to determine whether a distance between the user device and the vehicle control system is indicative of the user sitting in the driver's seat. Additionally, or alternatively, the user device may communicate with a position tracking system (e.g., a global positioning system (GPS)) to determine whether the vehicle is actually moving.

The user device may collect usage data while the user drives the vehicle. For instance, the user device may identify an orientation of the user device to determine whether a display of the user device can be viewed by the user, capture image data of the user viewing the display of the user device, monitor inputs/outputs of the user device, and track internal processes executed by the user device. Additionally, or alternatively, the user device may analyze the user profile and/or usage data to determine whether the user is distracted while driving the vehicle. For example, if the user has a history of being distracted while driving (which may include previous instances of the user glancing repeatedly at the user device while driving), has been receiving messages (e.g., text messages) from a cellular network, and is periodically viewing the display of the user device, the user device may determine that the user is distracted.

The user device may respond to the user being distracted in one or more of a variety of ways to prevent the user from continuing to drive while distracted. For example, the user device may play an alarm, a message, or another type of audio prompt to the user, disable one or more features (e.g., the display) of the user device, activate a sound system of the vehicle, communicate with the vehicle control system (e.g., to activate a braking system of the vehicle, to activate assisted driving functions of the vehicle, etc.), communicate with the diagnostics device to create a record of the user driving while distracted (which may later be accessed by a third-party, such as a company renting the vehicle to the user, an insurance company of the user, etc.), communicate with one or more third-party systems to alert nearby drivers that a distracted driver is in the area, contact a parent, guardian, or emergency contact of the user, contact an employer of the user, contact an insurance company of the user and/or the vehicle, contact local law enforcement, etc. As such, the user device may be used to determine whether a user is actually driving, gather information about the user while the user is driving, analyze the information to determine whether the driver is distracted, and prevent the driver from continuing to drive while distracted.

Figure 2:
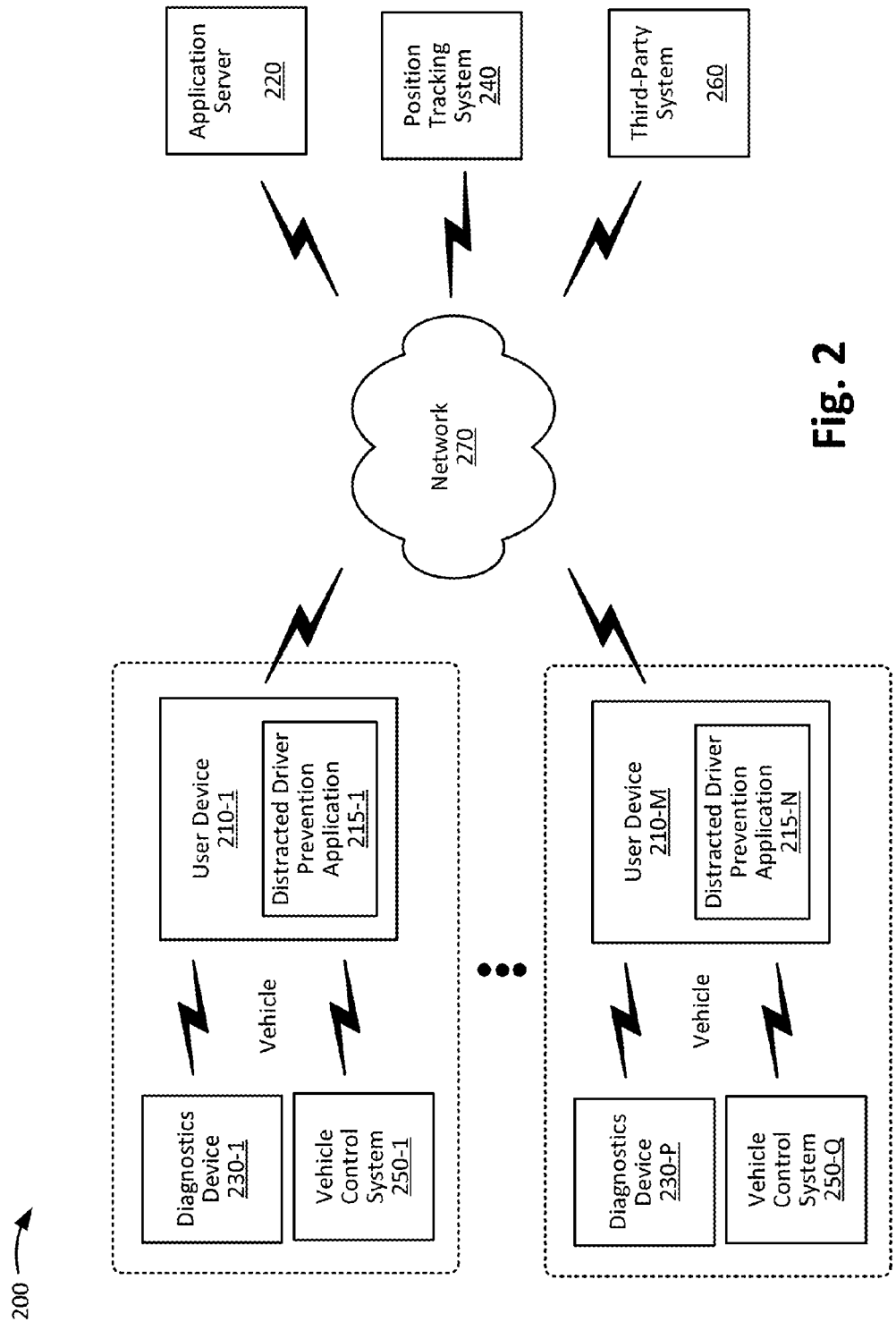
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is an integer greater than or equal to 1), distracted driver prevention applications 215-1 through 215-N (where N is an integer greater than or equal to 1), application server 220, diagnostics devices 230-1 through 230-P (where P is an integer greater than or equal to 1), position tracking system 240, vehicle control systems 250-1 through 250-Q (where Q is an integer greater than or equal to 1), third-party system 260, and network 270.

User device 210 may include a device capable of communicating via a network, such as network 270. For example, user device 210 may correspond to a mobile communication device (e.g., a smartphone, or a personal digital assistant (PDA)), a portable computer device (e.g., a laptop computer, a tablet computer, a wearable computer), and/or another type of device. In some implementations, user device 210 may display text, display graphics, produce audio signals, produce control signals, etc.

As depicted, user device 210 may include distracted driver prevention application 215 installed on a memory device of user device 210. Distracted driver prevention application 215 may enable user device 210 (e.g., a processor of user device 210) to perform one or more of the operations described herein, such as generating a user profile based on information received from a user and/or from application server 220, determining whether a user is sitting in a driver's seat of the vehicle by collecting image information and/or by communicating with diagnostics device 230, communicating with position tracking system 240 to determine whether the vehicle is moving, collecting usage data, analyzing the usage data to determine whether the user is distracted while driving, and responding to the usage analysis by prompting the driver to focus on driving the vehicle, disabling one or more features (e.g., a display) of user device 210, communicating with vehicle control system 250 to control driving functions (e.g., activate a braking system of the vehicle, turn off an engine (not shown) of the vehicle, etc.), communicating with diagnostics device 230 to log instances of the user driving while distracted, and/or communicating with third-party system 260 (e.g., to warn drivers of other vehicles that the user is driving while distracted, contact a guardian of the user, contact an employer of the user, contact local law enforcement, etc.).

Application server 220 may include one or more computing devices, such as a server device or a collection of server devices. Application server 220 may operate as an application server for distracted driver prevention application 215 of user device 210. In some implementations, application server 220 may send profile information (e.g., identification information, application preferences, driver behavior information, etc.) to user device 210 to assist user device 210 in generating and/or enhancing a user profile. Additionally, or alternatively, application server 220 may receive profile information from user device 210 and, for example, use the profile information to develop a user profile for one or more analogous drivers. Application server 220 may receive profile information from one or more other devices as well, such as from a desktop computer (not shown) being operated by a third party (e.g., a guardian or employer of the user) to create and/or modify the user profile for the user. In some implementations, application server 220 may operate as a portal for a third party to exercise one or more controls over the vehicle (possibly via user device 210 and vehicle control system 250), such as activating a braking system of the vehicle, generating an audio signal via a radio of the vehicle, turning off the engine of the vehicle, activating assisted driving functions of the vehicle, etc.

Diagnostics device 230 may include a device installed in the vehicle and capable of communicating with user device 210. For example, diagnostics device 230 may include a wireless electronic device (e.g., a Bluetooth device) installed in the vehicle and capable of establishing a wireless connection with user device 210. Diagnostics device 230 may include a removable device that is plugged into an on-board diagnostics ("OBD") port (e.g., an OBD-II port) of the vehicle. Diagnostics device 230 may assist user device 210 in determining whether the user of user device 210 is driving the vehicle by helping determine whether the user is located in a driver's seat of the vehicle. Additionally, or alternatively, diagnostics device 230 may receive usage data and/or instances of the user driving while distracted, which may later be provided to a third party such as law enforcement, an insurance company, a company renting the vehicle to the user, and/or another type of entity. Additionally, or alternatively, diagnostics device 230 may perform one or more other functions, such as tracking a speed of the vehicle, determining whether the vehicle is on or off, etc. While diagnostics device 230 may be installed in the vehicle in some implementations, in other implementations, diagnostics device 230 may include a removable device that is plugged into a diagnostics device that comes standard with the vehicle. In some implementations, diagnostics device 230, and/or one or more functions thereof, may be included in vehicle control system 250, or vice versa.

Position tracking system 240 may include one or more computing devices, such as a server device or a collection of server devices capable of determining changes in location of user device 210. In some implementations, position tracking system 240 may include a GPS system, a system that performs cellular triangulation techniques, and/or one or more other types of wireless systems capable of tacking the geographical movements of user device 210. Position tracking system 240 may be integrated into user device 210 and/or the vehicle. In some implementations, a position tracking system of the vehicle may be used to provide user device 210 with the geographical movements of user device 210. Additionally, or alternatively, when user device 210 is stationary for a period of time, position tracking system 240 may provide specific geographical location information to assist user device 210 in differentiating between whether, for example, the user has pulled the vehicle over in order to operate user device 210 in a safe environment or whether the user is merely stopped at a traffic light, in a traffic jam, etc.

Vehicle control system 250 may include one or more computing devices within the vehicle. In some implementations, vehicle control system 250 may be integrated in with the vehicle (e.g., installed by a manufacturer or a vendor of the vehicle), or installed later (e.g., by a user, a company renting the vehicle to the user, etc.). Vehicle control system 250 may be an OBD-II device and/or may communicate via another interface. In some implementations, vehicle control system 250 may include a device capable of controlling one or more functions of the vehicle, such as the braking system of the vehicle, the engine of the vehicle (e.g., whether the engine is on or off), a dashboard lighting system within the vehicle, a radio or other type of media system within the vehicle, a steering system, etc. Vehicle control system 250 may be capable of communicating with user device 210 to prevent a driver from driving while distracted by activating the braking system, turning the engine of the vehicle off, toggling the dashboard lighting system on and off and/or changing the lighting and/or color configuration of the dashboard lighting system, activating the radio or other media system of the vehicle, and/or by controlling one or more other systems with the vehicle.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
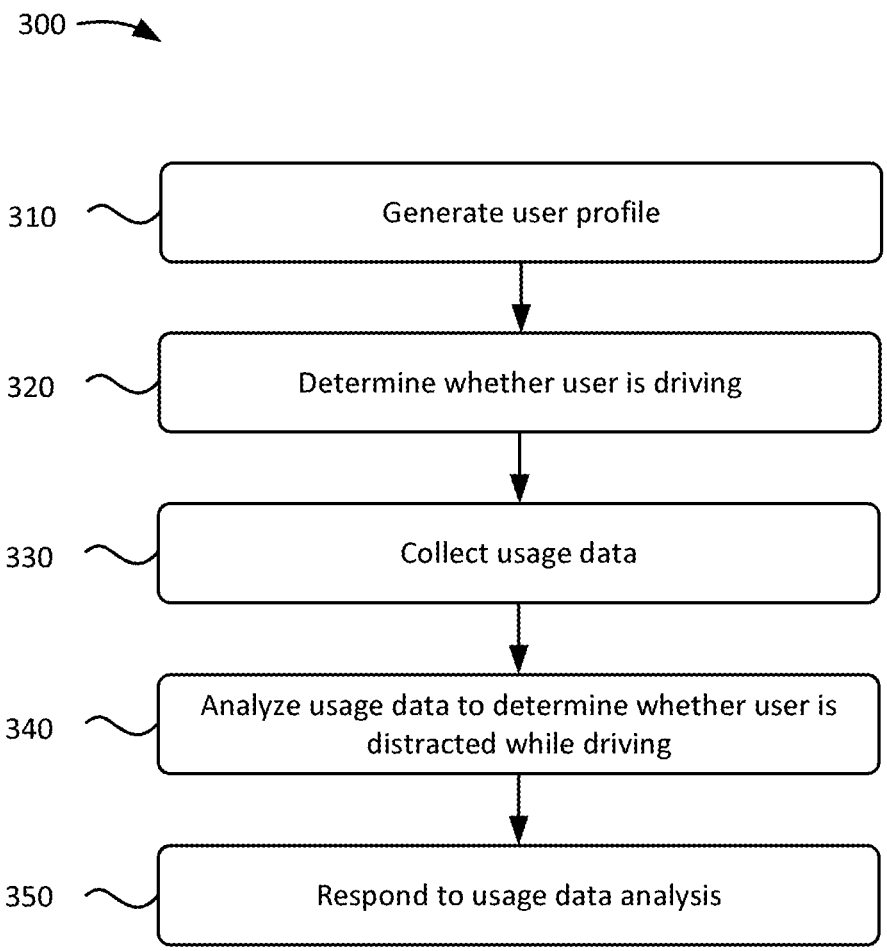
FIG. 3 illustrates a flowchart of an example process for preventing a user from driving while distracted by a user device.

FIG. 3 illustrates a flowchart of an example process 300 for preventing a user from driving while distracted by user device 210. In some implementations, process 300 may be performed by user device 210 (e.g., by distracted driver prevention application 215). In some implementations, some or all of the blocks of process 300 may be performed by one or more other devices. A description of FIG. 3 is provided below with reference to FIGS. 4-14, which provide examples of the operations presented in FIG. 3. A description of FIG. 3 is provided below with reference to FIGS. 4-14, which provide examples of the operations presented in process 300 of FIG. 3.

As shown in FIG. 3, process 300 may include generating a user profile (block 310). For example, user device 210 (e.g., distracted driver prevention application 215) may generate a user profile. In some implementations, user device 210 may generate the user profile based on profile information received from one or more sources, such as a user of user device 210 and/or from application server 220. Additionally, or alternatively, the profile information may be received by user device 210 at one or more times. For instances, some profile information may be received directly from the user and/or application server 220 the first time the user runs distracted driver prevention application 215, more profile information may be received as usage data is collected by distracted driver prevention application 215, and even more profile information may be received after usage information is applied to the user profile thereby triggering the acquisition of additional profile information in the form of analogous user information. As such, the information that makes up a user profile may not only be received from multiple sources, but may also be received at multiple times.

Profile information may include, for example, identification information (e.g., a name of the user, an age of the user, etc.), vehicle information (e.g., vehicle make, vehicle model, vehicle identification number (VIN), etc.), contact information (e.g., a telephone number, an email address, a home address, etc.), application preferences information (e.g., one or more application settings that the user may prefer to have enabled or disabled), and/or one or more other types of information. Additionally, or alternatively, the profile information may include response information, such as how user device 210 should respond to the user being distracted by user device 210 while driving (e.g., by playing back a recorded message, temporarily disabling user device 210, contacting a guardian, contacting an employer, activating a braking system of the vehicle, etc.), distraction information (e.g., usage data describing previous instances of the user driving while distracted, usage data describing an orientation of user device 210 associated with the user driving while distracted, usage data describing physical movement patterns of a user's body associated with the user driving while distracted, usage data describing internal processes of user device 210 associated with the user driving while distracted, etc.), and/or analogous user information (e.g., profile information relating to other users that are determined to be analogous to the user of user device 210 in one or more ways, such as age, physical attributes, diseases, disabilities, disorders, etc.).

Figure 4:
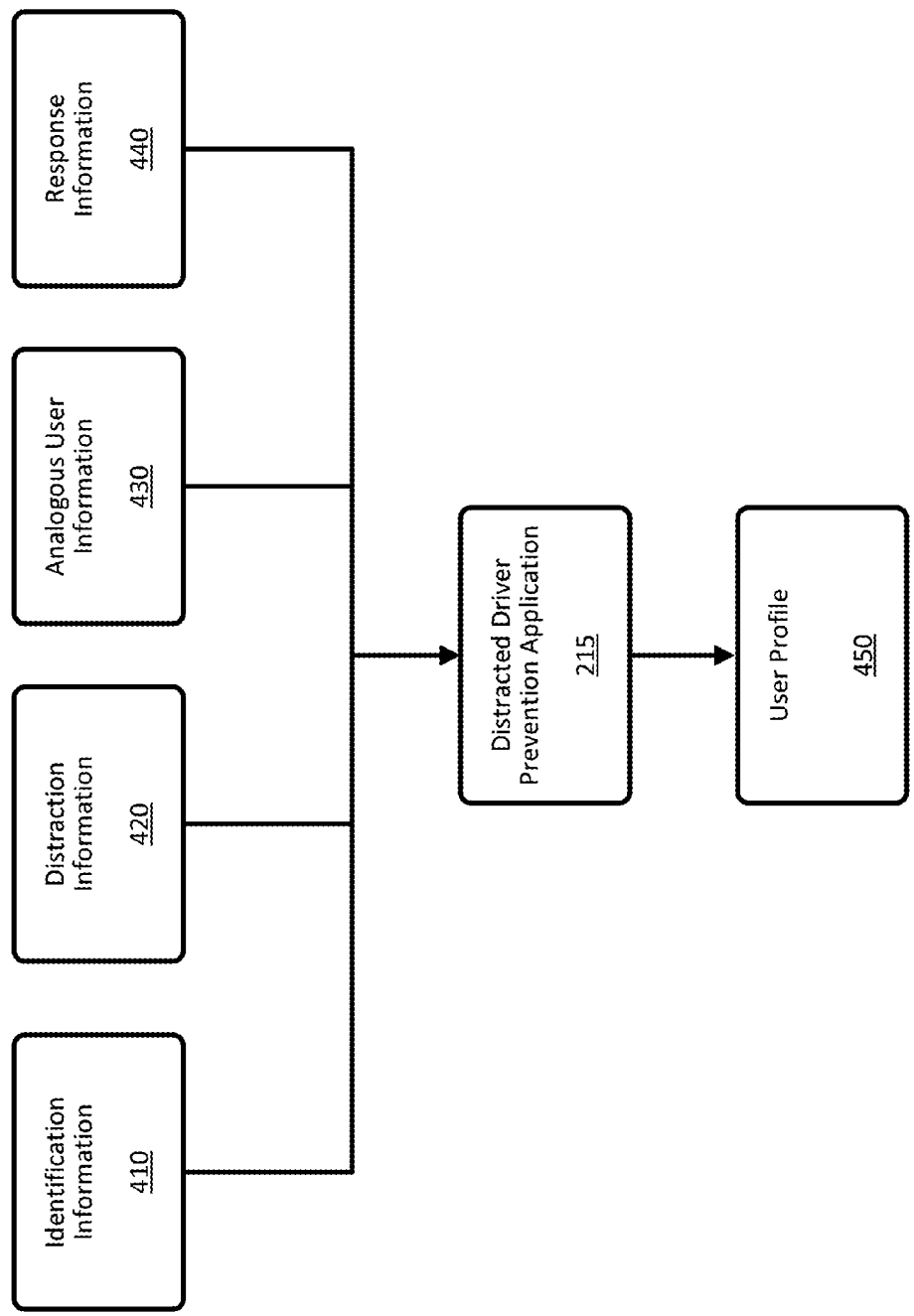
FIG. 4 illustrates a dataflow diagram of an example implementation for generating a user profile.

FIG. 4 illustrates a dataflow diagram of an example implementation for generating a user profile (e.g., at block 310). As depicted, distracted driver prevention application 215, which may be installed on user device 210, may receive one or more types of profile information, such as identification information 410, distraction information 420, analogous user information 430, and response information 440, and/or may use the profile information 410-440 to create and/or update user profile 450. The profile information 410-440 may be received by distracted driver prevention application 215 at different times and from different sources.

For instance, when user device 210 initiates distracted driver prevention application 215 for the first time, identification information 410, response information 440, and one or more other types of profile information (e.g., contact information, vehicle information, etc.) may be received from the user in order to create a user profile initially. Some or all of the profile information received from the user may be sent to application server 220, and in response, analogous user information 440 may be received from application server 220 to further enhance user profile 460. Application server 220 may identify analogous users by identifying a similarity and/or a combination of similarities between two users. For instance, analogous users may have similar ages, schedules, and/or driving records, and/or may have one or more other types of similarities.

Distraction information may be received by distracted driver prevention application 215 in response to collecting usage data while the user drives a vehicle, which may also, or alternatively, be used to generate and/or enhance driver profile 450. If driver profile 450 is later modified (e.g., by additional identification information, distraction information, etc.), distracted driver prevention application 215 may update user profile 450 by obtaining different and/or additional analogous user information 430 from application server 220, since user profile 450 may have become analogous to different and/or additional users than was previously the case. As such, distracted driver prevention application 215 may receive one or more types of profile information 410-440 at one or more times and/or from one or more sources, resulting in a dynamically customized user profile 450.

Referring again to FIG. 3, process 300 may include determining whether a user is driving (block 320). For example, user device 210 may determine whether a user is driving. In some implementations, user device 210 may determine whether the user is driving by determining whether the vehicle is moving and/or determining whether the user is sitting in a driver's seat of a vehicle. User device 210 may determine that the vehicle is moving by, for example, communicating with position tracking system 240, vehicle control system 250 (e.g., to determine whether the engine of the vehicle is running, whether an odometer is registering movement, etc.), and/or one or more other types of systems capable of determining whether the vehicle is moving. User device 210 may determine whether the user is sitting in a driver's seat of a vehicle by collecting image data (e.g., a seatbelt, steering wheel, a gear shifter, etc.) that is indicative of the user sitting in the driver's seat of the vehicle and/or by communicating with an diagnostics device 230 of the vehicle. For instance, if the shoulder strap of a seatbelt is stretching diagonally from upper left to lower right, user device 210 may determine, or treat such as image as evidence, that the user of user device 210 is driving.

Figure 5:
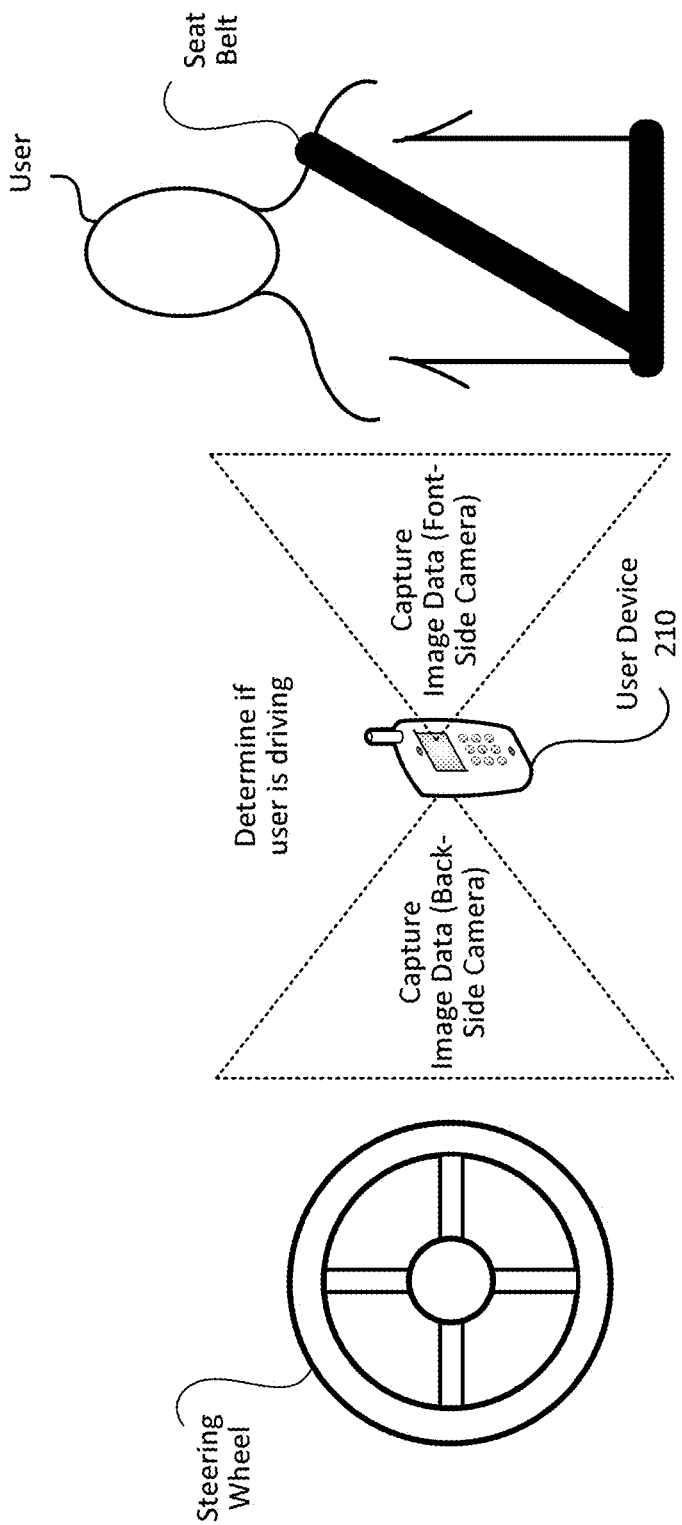
FIGS. 5 and 6 illustrate example implementations of determining whether a user is in a driver's seat of a vehicle.

FIG. 5 illustrates an example implementation for determining whether a user is in a driver's seat of a vehicle. As shown, user device 210 may capture image data using a front-side camera of user device 210 and a back-side camera of user device 210. Each camera of user device 210 may capture image data to define the local environment of user device 210, which may enable user device 210 to infer the location of the user with the vehicle. For instance, the front-side camera of user device 210 may capture image data corresponding to a seatbelt across the chest area and/or lap of the user, while the back-side camera may capture image data corresponding to a steering wheel of the vehicle. Based on the image data captured by the front-side camera, user device 210 may infer that the user is located in a vehicle (and intends to be there for a while since the seatbelt is fastened), and/or based on the image data captured by the back-side camera user device 210 may infer that the user is located in the driver's seat of the vehicle.

Additional examples of image data that may be collected by user device 210 to determine the location of the user within the vehicle may include one or more driver console features (e.g., a speedometer, an odometer, etc.), a gear shifter, a center console, a glove compartment, a rearview mirror, a back seat, a front seat, a window, a location of another passenger, etc. For example, image data of a gear shifter with a glove compartment in the background may be indicative of the user being located in the driver's seat, whereas image data of a front seat may be indicative of the user being located in a back seat. As such, user device 210 may gather image information using one or more cameras to determine whether a user is located in a driver's seat.

Figure 6:
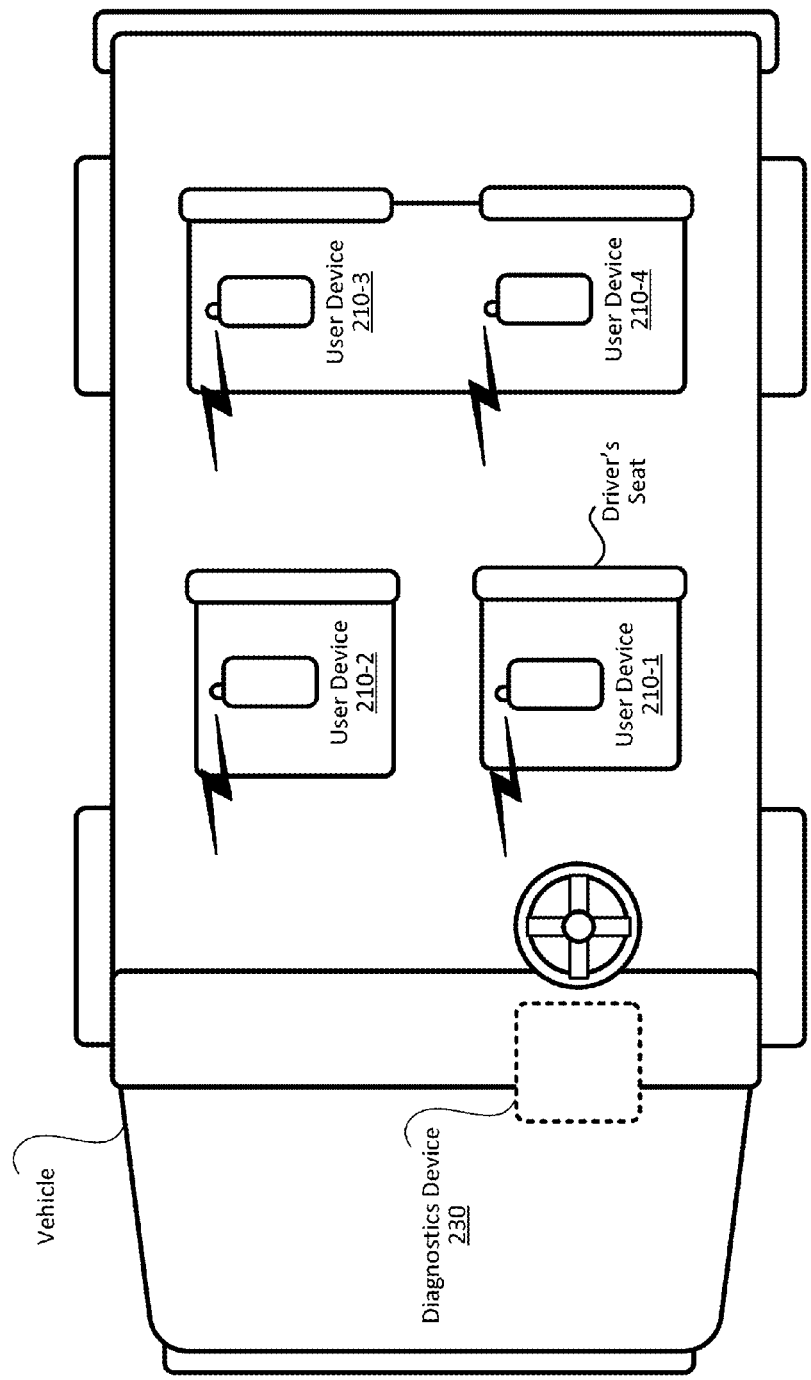

FIG. 6 illustrates another example implementation for determining whether a user is in a driver's seat of a vehicle. As shown, one or more user devices 210 may communicate with diagnostics device 230 to determine a distance between user device 210 and diagnostics device 230. Ascertaining the distance between user device 210 and diagnostics device 230 may enable user device 210 to infer whether the user of user device 210 is located in a driver's seat of the vehicle. The distance between user device 210 and diagnostics device 230 may be collected, for example, by measuring the time required for a signal to be transmitted between user device 210 and diagnostics device 230, by measuring a signal strength between user device 210 and diagnostics device 230, and/or by one or more other types of distance measuring techniques.

The measured distance between user device 210 and diagnostics device 230 may be calculated based on one or more measurements. For instance, since the distance between user device 210 and diagnostics device 230 may change (e.g., as the user uses user device 210, if a use device is passed to different passengers within the vehicle, etc.), the distance between user device 210 and diagnostics device 230 may be measured periodically (e.g., every 5 seconds) and/or may consist of an average of multiple distances measured over a period of time. While the distance between user device 210 and diagnostics device 230 may be measured by user device 210, diagnostics device 230 may also, or alternatively, measure the distance. For instance, diagnostics device 230 may measure distances for all user devices 210 in the vehicle and notify user device 210-1 that the user of user device 210-1 is located in the driver's seat since user device 210-1 corresponds to a preselected distance (or range of distances) indicative of the user of user device 210-1 being in the driver's seat. Additionally, or alternatively, when diagnostics device 230 is located near the driver's seat (as shown in FIG. 6), diagnostics device 230 may measure distances for all user devices 210 in the vehicle and notify user device 210-1 that the user of user device 210-1 is located in the driver's seat since user device 210-1 is the closest user device 210 to diagnostics device 230.

Referring again to FIG. 3, process 300 may include collecting usage data (block 330). For example, user device 210 may collect usage data. Usage data may include one or more types of information that may be relevant to determining whether the user of user device 210 is, or may become, distracted by user device 210. Examples of usage data may include a communication between user device 210 and network 270, a communication between user device 210 and the user of user device 210, and/or an internal process executed by user device 210. Usage data may additionally, or alternatively, include one or more other types of information, such as timing information. For instance, user device 210 may collect timing information corresponding to a communication between user device 210 and network 270, a communication between user device 210 and the user of user device 210, and/or an internal process performed by user device 210.

Figure 7:
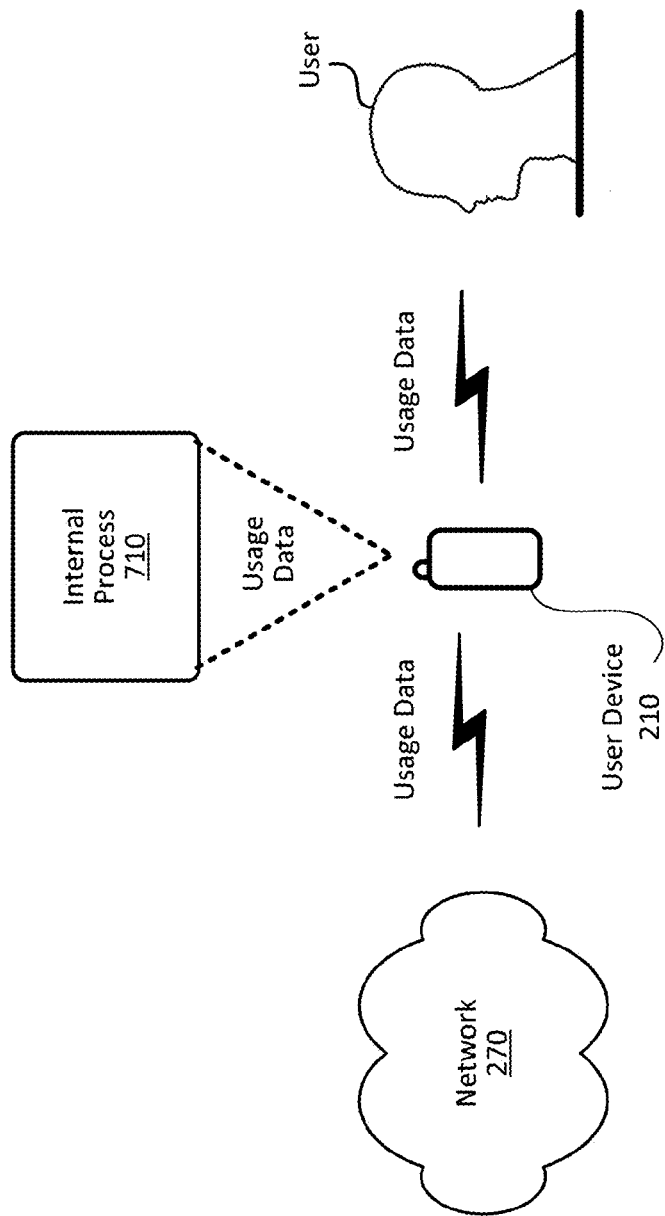
FIG. 7 illustrates an example implementation for collecting usage data.

FIG. 7 illustrates an example implementation for collecting usage data. As shown, user device 210 may collect usage data associated with a communication between user device 210 and network 270, a communication between user device 210 and the user of user device 210, and/or internal process 710 performed by user device 210. Usage data associated with a communication between user device 210 and network 270 may include sending and/or receiving information associated with a text message, an email, a telephone call, a video conference, a search engine query, a search engine query result, information corresponding to browsing the Internet, information associated with an application installed on user device 210 (e.g., a push notification), a software update for user device 210, and/or one or more other types of information sent to, or received from, network 270.

Usage information associated with a communication between user device 210 and the user of user device 210 may include any type of input/output communicated between the user and user device 210. Inputs from the user may include active inputs, such as the user pressing a button or typing information into user device 210, providing audio commands via a microphone of user device 210, etc., and/or passive inputs, such as user device 210 detecting a face of the user when the user glances at a display of user device 210, detecting a change in orientation of user device 210 when the user moves user device 210, etc. Outputs from user device 210 to the user may include an audio output, a visual output, and/or a physical output (e.g., a vibration). Examples of outputs from user device 210 to the user may include displaying a graphical interface on a display of user device 210, outputting a bell, a beep, a pre-recorded audio message, and/or another type of audio output to the user, and/or causing user device 210 to vibrate in response to, for example, receiving a telephone call, a text message, an email, etc.

Usage data associated with internal processes 710 of user device 210 may include user device 210 executing one or more types of operations, one or more of which may be associated with an input/output to network 270 and/or the user. Examples of usage data associated with internal process 710 may correspond to executing a command from the user of user device 210 (e.g., accessing a list of contacts, initiating a telephone call, generating a text message based on text received from the user, etc.) and/or processing information received from network 270 (e.g., generating graphical information for display based on a text message, an email, a push notification, etc., providing a notification from network 270 to the user of user device 210, etc.). Additionally, or alternatively, examples of usage data associated with internal process 710 may corresponding to a purely internal operation (e.g., detecting a trigger associated with a schedule or alarm clock feature of user device 210, detecting a position or orientation change of user device 210, etc.) and/or one or more other types of operations that may be relevant to determining whether the user of user device 210 is, or may become, distracted by user device 210. Additional examples of collecting usage data are provided below with reference to FIGS. 8-12.

Figure 8:
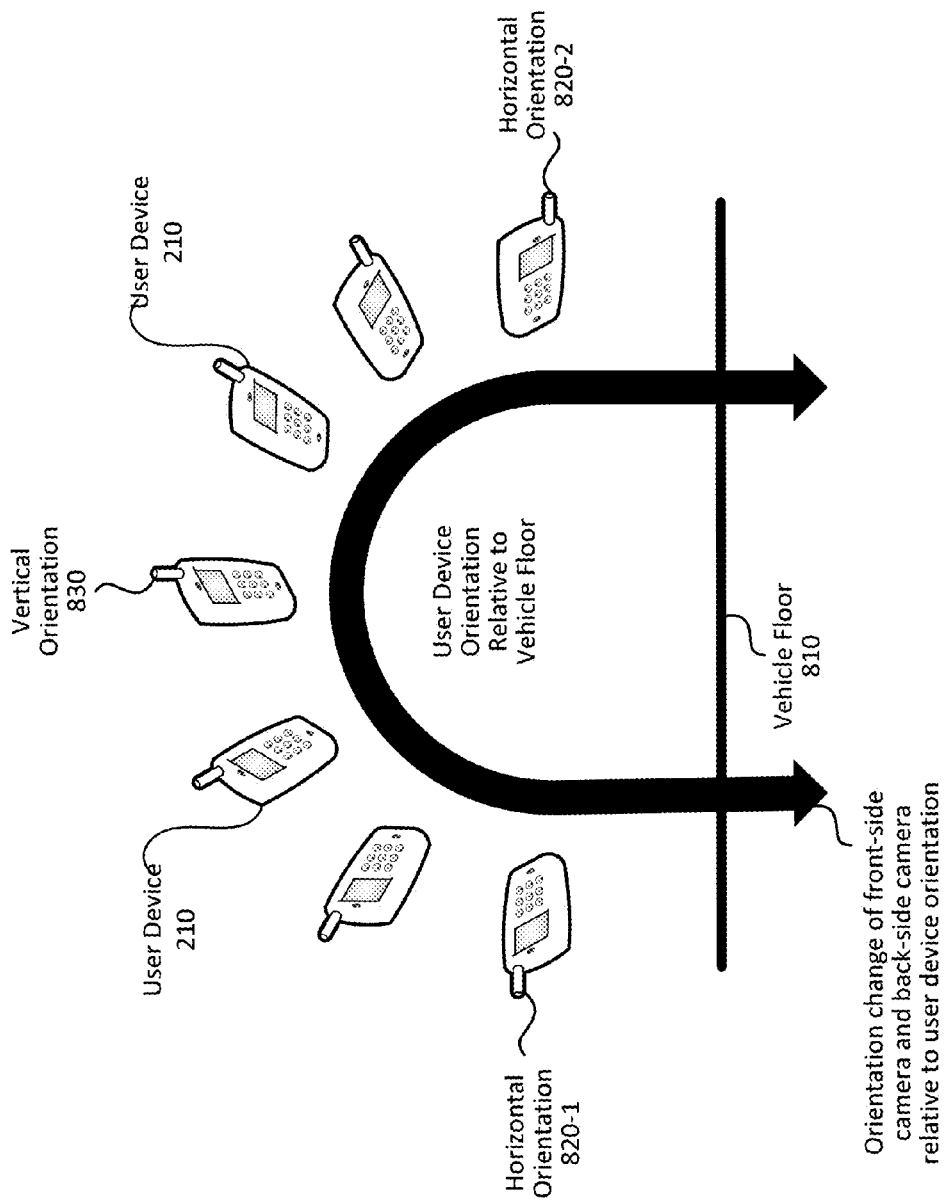
FIG. 8 illustrates an example of user device orientations.

FIG. 8 illustrates an example of user device orientations. As shown, user device 210 may have a horizontal orientation 820 with respect to vehicle floor 810, a vertical orientation 830 with respect to vehicle floor 810, and/or a combination of a horizontal orientation and a vertical orientation with respect to vehicle floor 810. User device 210 may have a primarily horizontal orientation (820) when user device 210 is, for example, placed on a relatively flat surface within the vehicle (e.g., a center console, an empty passenger seat, a lap of the user, etc.), held by the user in a relatively horizontal position, etc. As another example, user device 210 may have a primarily vertical orientation 830 when user device 210 is, for example, in a user device mount installed within the vehicle, held in a vertical position by the user, propped up against a driver console of the vehicle, etc. In some implementations, the orientation of user device 210 may change. For instance, the user may position user device 210 in horizontal position 820, receive a text message, and manually move user device 210 from horizontal position 820 to vertical positon 830 in order to view the text message.

As mentioned above, user device 210 may collect usage data corresponding to the orientation (and/or change in orientation) of user device 210. User device 210 may detect an orientation of user device 210 using an accelerometer within user device 210, one or more cameras of user device 210, and/or one or more other devices of user device 210. For instance, an accelerometer of user device 210 may indicate that user device 210 is in a horizontal orientation or a vertical position; however, a front-side camera and/or a back-side camera of user device 210 may determine whether user device 210 is laying with a display-side of user device 210 facing upward or a display-side of user device 210 facing downward. For example, if the back-side camera of user device 210 detects mostly blackness, whereas the front-side camera of user device 210 detects non-blackness (e.g., a roof of the vehicle), user device 210 may determine that user device 210 is laying on a horizontal surface with the display side of user device 210 facing upward (e.g., horizontal orientation 820-1). However, if the front-side camera of user device 210 detects only blackness, whereas the back-side camera of user device 210 detects non-blackness (e.g., a roof of the vehicle), user device 210 may determine that user device 210 is laying on a horizontal surface with the display side of user device 210 facing downward (e.g., horizontal orientation 820-2).

Determining an orientation of user device 210 may better enable user device 210 to determine whether the user is distracted by user device 210. For instance, determining if the display-side of user device 210 is upward or downward may help determine whether the user of user device 210 is distracted by user device 210 since, for example, the user would be unable to view the display of user device 210 when user device 210 is facing downward. Additionally, or alternatively, if user device 210 undergoes an orientation change from horizontal to vertical shortly after receiving a text message, the change in orientation may be used to infer that the user is reading the text message and, therefore, distracted by user device 210. Additionally, or alternatively, determining a change in orientation may help gather other types of usage data. For instance, image data indicative of the user viewing a display of user device 210 may be different depending on whether user device 210 is in horizontal orientation 820, vertical orientation 830, and/or a combination thereof, since the user may need to tilt his or her head in order to view the display of user device 210. As such, determining the orientation of user device 210 may enable user device 210 to be responsive to different types of image data based on the orientation of user device 210.

Figure 9:
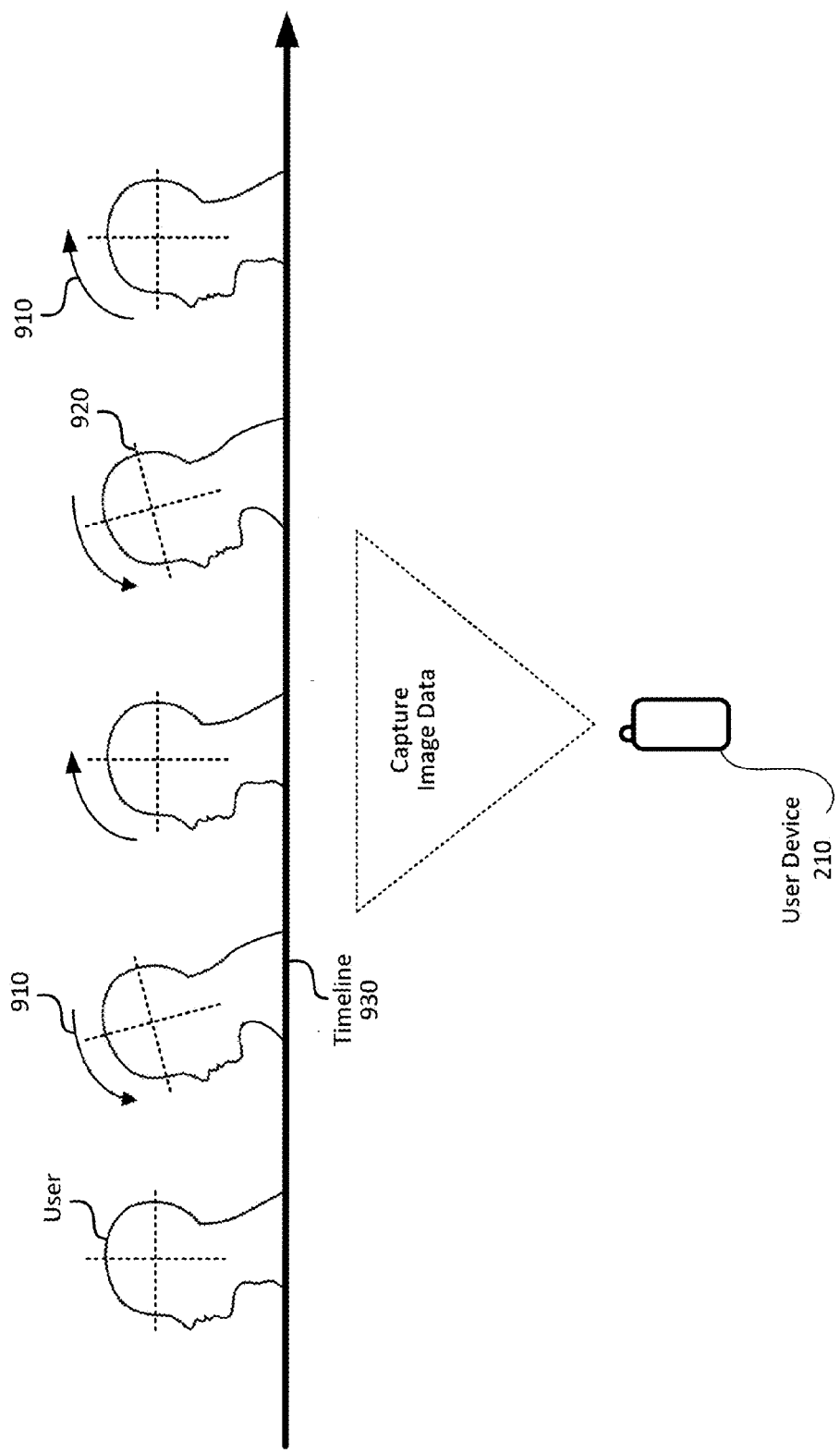
FIGS. 9 and 10 illustrate example implementations for capturing image data corresponding to a user is viewing a user device.
Figure 10:
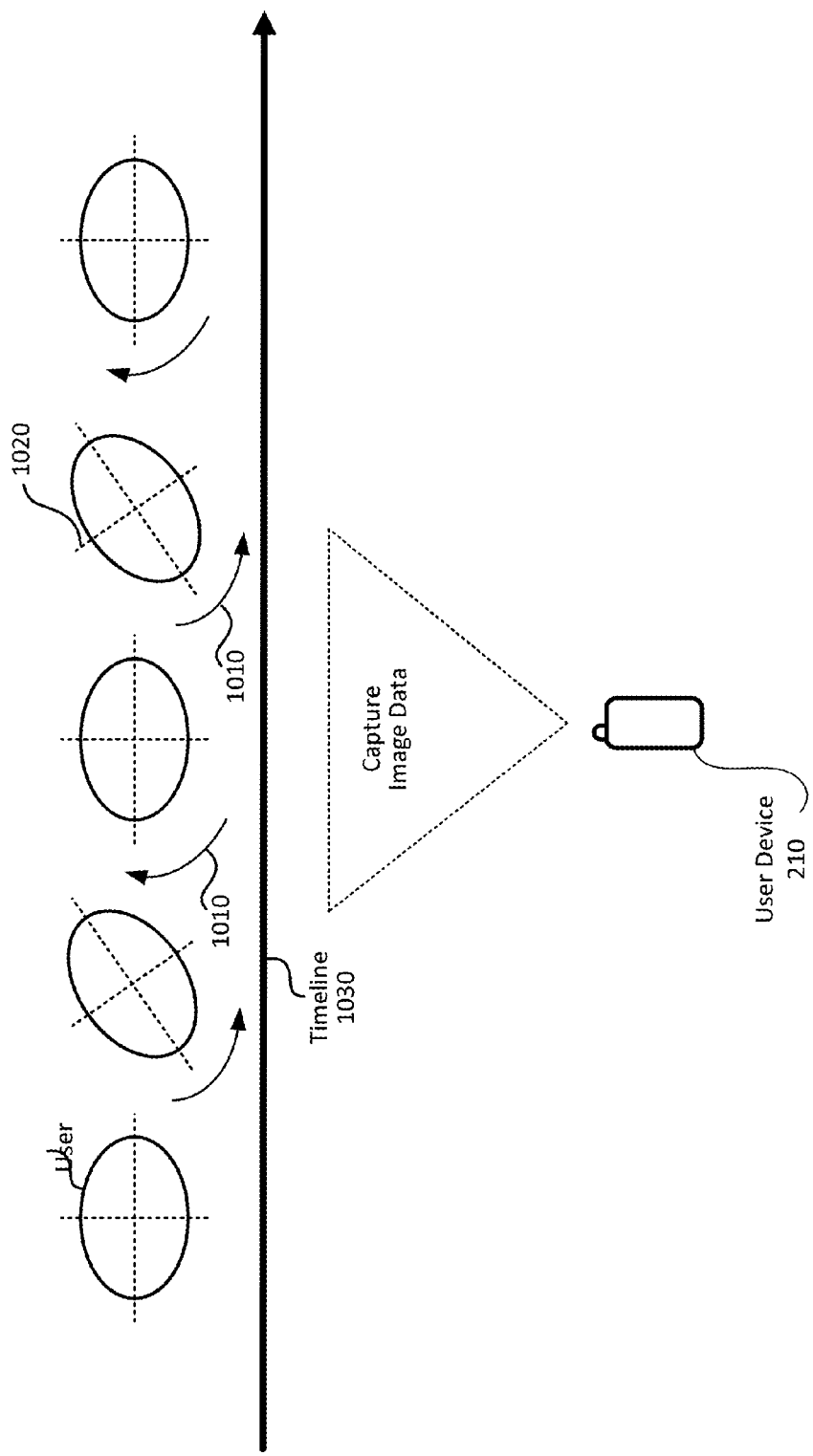

FIGS. 9 and 10 illustrate example implementations for capturing image data corresponding to a user is viewing user device 210. As shown in FIG. 9, user device 210 may collect image data of a user viewing user device 210, which may include periodic vertical angular movements of the user's head and neck toward user device 210. For instance, as the user views a display of user device 210, the head of the user may pivot up and down in a pattern consistent with the user periodically glancing at user device 210, as represented by changes in angular movement arrows 910 and reference grid 920 along timeline 930. Such vertical angular movements may be detected by a camera (e.g., a front-side camera using facial recognition technologies) of user device 210, and collected by user device 210 as usage data. User device 210 may also, or alternatively, collect degree, time, frequency, and other types of information regarding the user viewing user device 210 to, for example, determine how severely the user is distracted by user device 210. In some implementations, user device 210 may do so by, for example, comparing the image data collected by user device 210 against reference data (e.g., data that indicates a lower level of distraction, data that indicates a greater level of distraction, etc.).

As shown in FIG. 10, user device 210 may collect image data of a user viewing user device 210, which may include horizontal angular movements of the head of the user. For instance, as the user views a display of user device 210, the head of the user may pivot from one side to another in a pattern consistent with the user periodically glancing at user device 210, as represented by changes in angular movement arrows 1010 and reference grid 1020 along timeline 1030. Such horizontal angular movements may be detected by a camera (e.g., a front-side camera using facial recognition technologies) of user device 210, and collected by user device 210 as usage data. User device 210 may also, or alternatively, collect degree, time, frequency, and other types of information regarding the user viewing user device 210 to, for example, determine how severely the user is distracted by user device 210. In some implementations, user device 210 may do so by, for example, comparing the image data collected by user device 210 against reference data (e.g., data that indicates a lower level of distraction, data that indicates a greater level of distraction, etc.).

Figure 11:
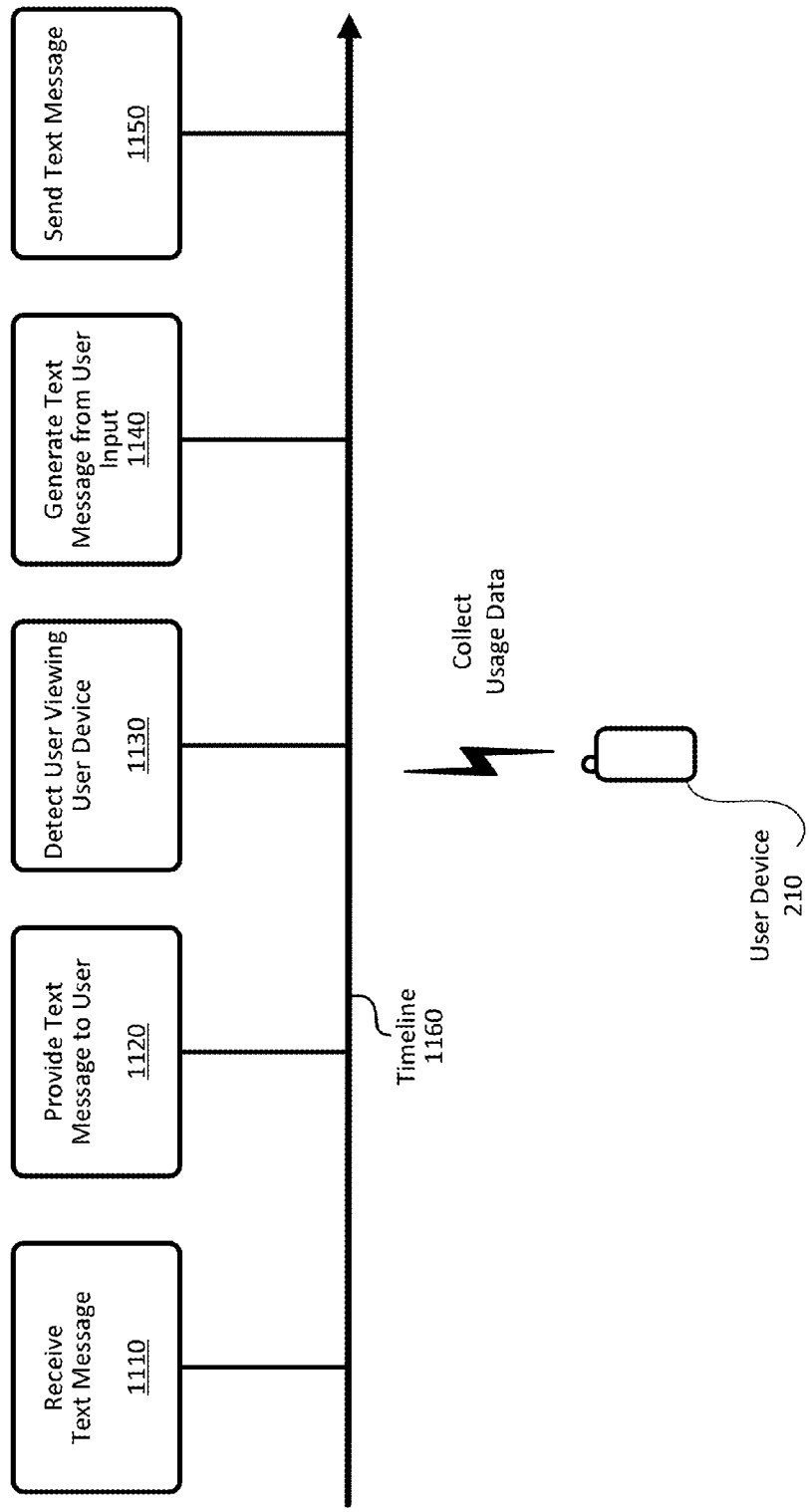
FIGS. 11 and 12 illustrate example implementations for collecting usage data.
Figure 12:
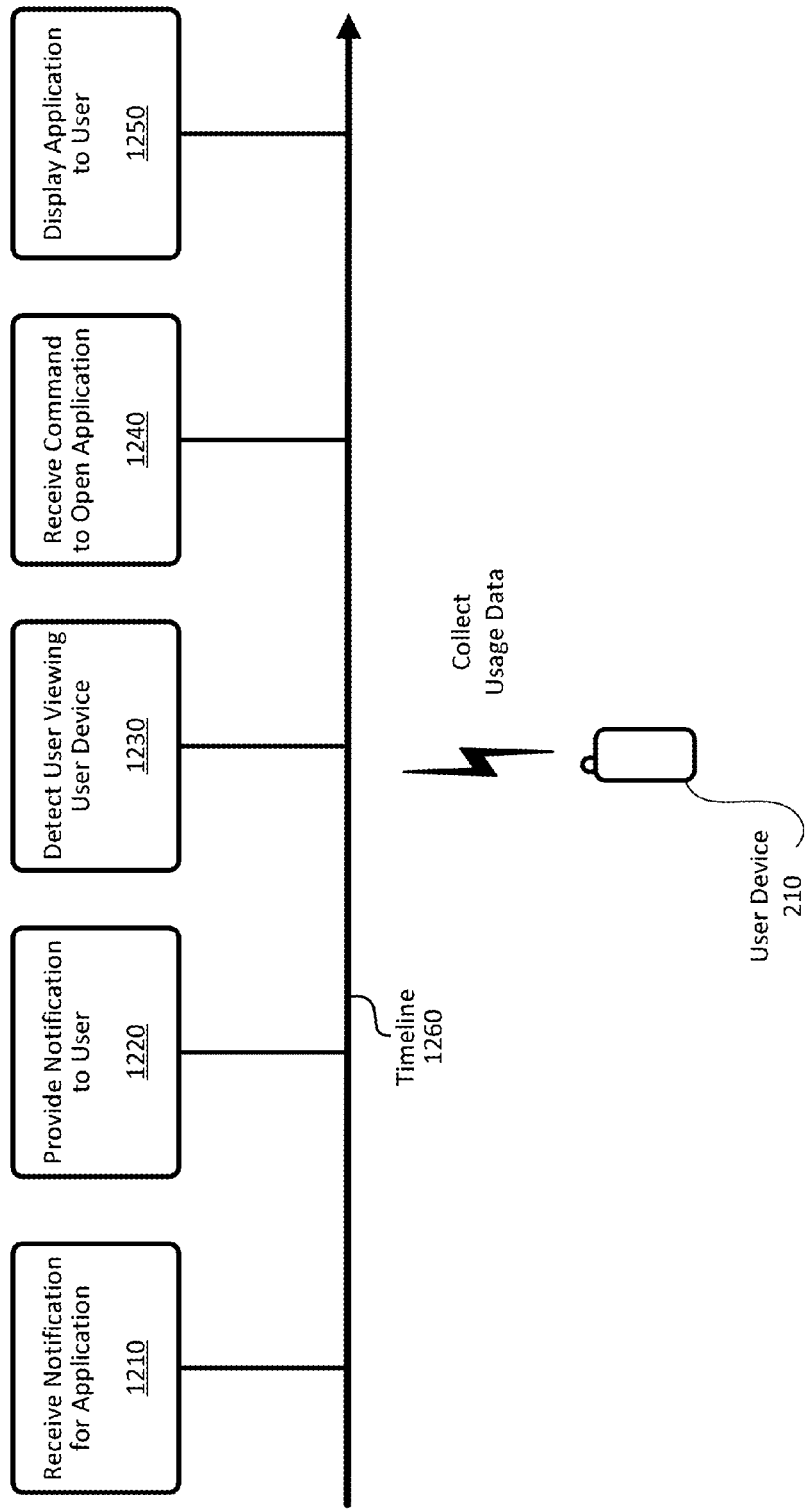

FIGS. 11 and 12 illustrate further example implementations for collecting usage data. As shown in FIG. 11, user device 210 may collect usage data corresponding to operations 1110-1150 along timeline 1160. User device 210 may receive a text message (block 1110) via, for example, network 270. User device 210 may provide the text message to a user of user device 210 by, for example, generating a prompt (e.g., a beep, a ding, a ring, a vibration, etc.), displaying the text message to the user, and/or providing a text message interface to the user. The text message interface may include the text message received from network 270 and/or a text box for responding to the text message. User device 210 may detect user viewing user device 210 (block 1130), which may include, for example, one or more operations (e.g., detecting an orientation of user device 210, detecting the user viewing user device 210, etc.) described above with reference to FIGS. 8-10. User device 210 may generate a text message based on information received from the user (block 1140) and/or send the text message (block 1150) in response to the text message. Usage data corresponding to one or more of operations 1110-1150 may be collected by user device 210 and/or time information (e.g., a timestamp) corresponding to one or more of operations 1110-1150. Collecting usage data may help determine whether, and/or how severely, the user of user device 210 is distracted by user device 210.

As shown in FIG. 12, user device 210 may collect usage data corresponding to operations 1210-1250 along timeline 1260. User device 210 may receive a notification (e.g., a push notification) corresponding to an application (block 1210) installed on user device 210, such as a news application, a social networking application, an email application, a messaging application, an application for updating other applications, etc. User device 210 may provide the notification to a user of user device 210 (block 1220) by, for example, generating a prompt (e.g., a beep, a ding, a ring, a vibration, etc.), displaying a visual prompt (e.g., a summary and/or description corresponding to the notification, etc.). User device 210 may detect the user viewing user device 210 (block 2130), which may include one or more operations (e.g., detecting an orientation of user device 210, detecting the user viewing user device 210, etc.) described above with reference to FIGS. 8-10. User device 210 may receive a command from the user to open the application corresponding to the notification (block 1240), and user device 210 may display the application to the user (block 1250). Usage data corresponding to one or more of operations 1210-1250 may be collected by user device 210 and/or time information (e.g., a timestamp) corresponding to one or more of operations 1210-1250. Collecting usage data may help determine whether, and/or how severely, the user of user device 210 is distracted by user device 210.

Referring again to FIG. 3, process 300 may include analyzing usage data to determine whether a user is distracted while driving (block 340). For example, user device 210 may analyze usage data to determine whether a user is distracted while driving. User device 210 may implement one or more of a variety of techniques for analyzing usage data to determine whether driver 510 is distracted.

For example, user device 210 may define a distraction threshold based on one or more aspects of user profile 450 and/or one or more types of usage data (e.g., whether the user has a general propensity to be distracted by user device 210 while driving, whether the user is driving at a particular time, for a particular duration, and/or along a particular route where the user and/or analogous users have been distracted by user device 210 before, what type of media is being played by the vehicle (e.g., users may have a lower propensity to be distracted by user device 210 playing music than by user device 210 displaying an image, playing a video, etc.), the orientation of user device 210, whether the user has been, or is, viewing user device 210, inputs/outputs of user device 210, etc.), and determine that the driver is distracted when usage data exceeds the distraction threshold. Additionally, or alternatively, user device 210 may define distraction thresholds for different aspects of user profile 450 and/or one or more types of usage data, and determine that a user is distracted when user profile 450 and usage data exceed all, a pre-selected percentage, a pre-selected number of the drowsiness thresholds, and/or a pre-selected combination of the distraction thresholds. In some implementations, user device 210 may also, or alternatively, use one or more default settings when defining a distraction threshold and comparing usage data to the distraction threshold.

In some implementations, user device 210 may define distraction thresholds for different levels of confidence with respect to the user being distracted. For instance, user device 210 may define a distraction threshold that corresponds to merely being suspicious that a user is distracted and another distraction threshold for being certain that the user is distracted. In such implementations, defining distraction thresholds for different levels of confidence may, for example, enable user device 210 to customize responses to the user being distracted according to a level of confidence regarding the user actually being distracted. For example, when user device 210 is merely suspicious of the user being distracted, user device 210 may provide an audio message prompting the user to state whether he or she is distracted; however, when user device 210 is certain of the user being distracted, user device 210 may disable one or more features (e.g., a display, a keyboard, an application, a text message service, an email service, a data service, etc.) of user device 210. In some implementations, the feature disabled may correspond to a feature identified by user device 210 as being a source and/or a primary source (e.g., a feature that is a greater distraction than other distracting features of user device 210) of distraction for the user. A distraction threshold may be defined using one or more quantitative and/or qualitative measurement techniques, which may be implemented using one or more indexing techniques for each type of information upon which the distraction threshold is based. As such, user device 210 may analyze usage data to determine whether the user is distracted in one or more of a variety of ways.

Figure 13:
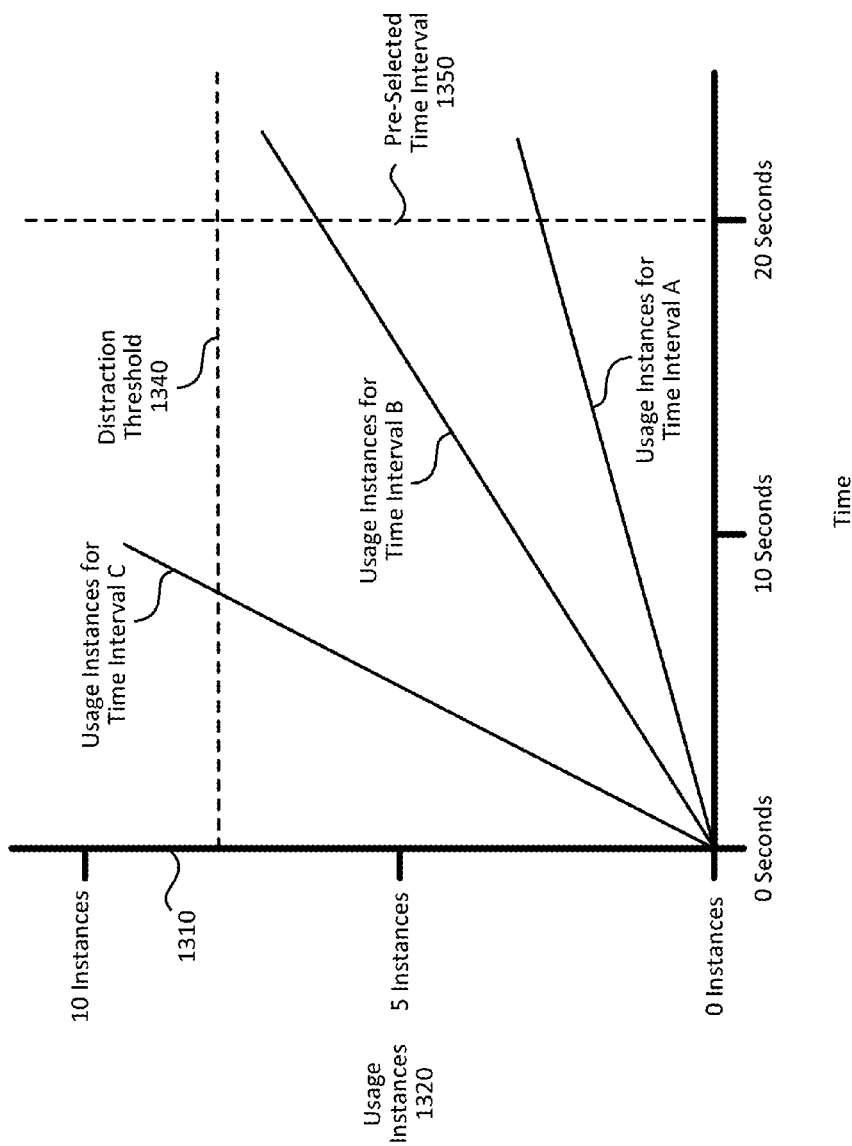
FIG. 13 illustrates an example representation of usage instances over recurring time intervals in determining whether a user is distracted by a user device.

FIG. 13 illustrates an example representation of usage instances over recurring time intervals in determining whether a user is distracted by user device 210. As shown in FIG. 13, the representation may include graph 1310 that includes vertical axis of usage instances 1320, horizontal axis of time 1130, distraction threshold 1340, and pre-selected time interval 1350. User device 210 may determine that a user is distracted when a number of usage instances 1320 exceeds distraction threshold 1340 within pre-selected time interval 1350.

A usage instance may include one or more types of usage data. For example, a single usage instance may include a single type of usage data, such as the user viewing a display of user device 210, the user accessing an application installed on user device 210, a user inputting information into user device 210, etc. Additionally, or alternatively, a single usage instance may include a collection of related usage data (e.g., a sequence of events), such as user device 210 receiving data, displaying the data to a user, and determining that the user has viewed the data. In such implementations, the usage data specifying a sequence of events to a usage instance may specify a pre-selected period of time (e.g., 2 seconds, 5 seconds, 10 seconds, etc.) within which the usage data should be collected. Additionally, or alternatively, one type of usage data may be given different consideration than another type of usage data. For instance, the user unexpectedly viewing user device 210 to check the time may not be given the same weight (in terms of distraction threshold 1340 and/or usage instance 1320) as the user viewing user device 210 2 seconds after a text message has been received (presumably to read and possibly respond to the text message). As such, the relationship between types of usage data and a usage instance by user device 210 may be 1 to 1, many to 1, 1 to many, or many to many. In some implementations, the type (or types) of usage data required for a single usage instance may depending, at least in part, on user profile 450 corresponding to the user of user device 210.

As shown, graph 1310 includes usage instances for three different time intervals, time interval A, time interval B, and time interval C. In this example, the number of instances for time intervals A and B failed to equal or exceed distraction threshold 1340. However, the number of instances of time interval C exceeded distraction threshold 1340 within pre-selected time interval 1350. As such, user device 210 may determine that the user is not distracted by user device 210 during time intervals A and B; however, user device 210 may determine that the user is distracted during time interval C and may respond accordingly. In some implementations, each time interval may be a successive time interval (e.g., time interval B may begin at the conclusion of time interval A, time interval C may begin at the conclusion of time interval B, and so on). In some implementations, a time interval may overlap with one or more time intervals. For instance, time interval B may begin at any point during time interval A, time interval C may begin at any point during time interval A and/or B, etc. In such implementations, user device 210 may determine that a user is distracted if a number of usage instances ever exceeds distraction threshold 1340 within any time period that is less than, and/or equal to, pre-selected time interval 1350.

Returning again to FIG. 3, process 300 may include responding to the usage data analysis (block 350). For example, user device 210 may respond to the usage data analysis performed at block 340. In some implementations, user device 210 may respond in one or more of a variety of ways, such as alerting the user with an audio signal, disabling one or more features of user device 210, reporting usage data and/or a determination that the user is driving while distracted to diagnostics device 230, activating a braking system of the vehicle, activating a radio or other media device of the vehicle, communicating a warning to other drivers that a driver in their vicinity is driving while distracted, contacting a guardian, an emergency contact, an employer, and/or law enforcement, etc. In some implementations, user device 210 may respond to the user being distracted based user profile 450. User device 210 may also, or alternatively, respond to the user being distract based on one or more default settings of distracted driver prevention application 215.

In some implementations, user device 210 may respond to a usage data analysis by collecting usage data (See, block 330). For example, if user device 210 analyzes usage data for a user and determines that the user is not distracted, user device 210 may respond to the analysis of the usage data by continuing to collect usage data. User device 210 may also, or alternatively, respond to a usage data analysis by continuing to collect usage data when the usage data analysis shows that the driver is distracted. As mentioned above, collected usage data, usage data analyses, and/or responses to usage data analyses may be used to update user profile 450 and/or sent to application server 220 to create and update user profiles 450 of analogous drivers.

Figure 14:
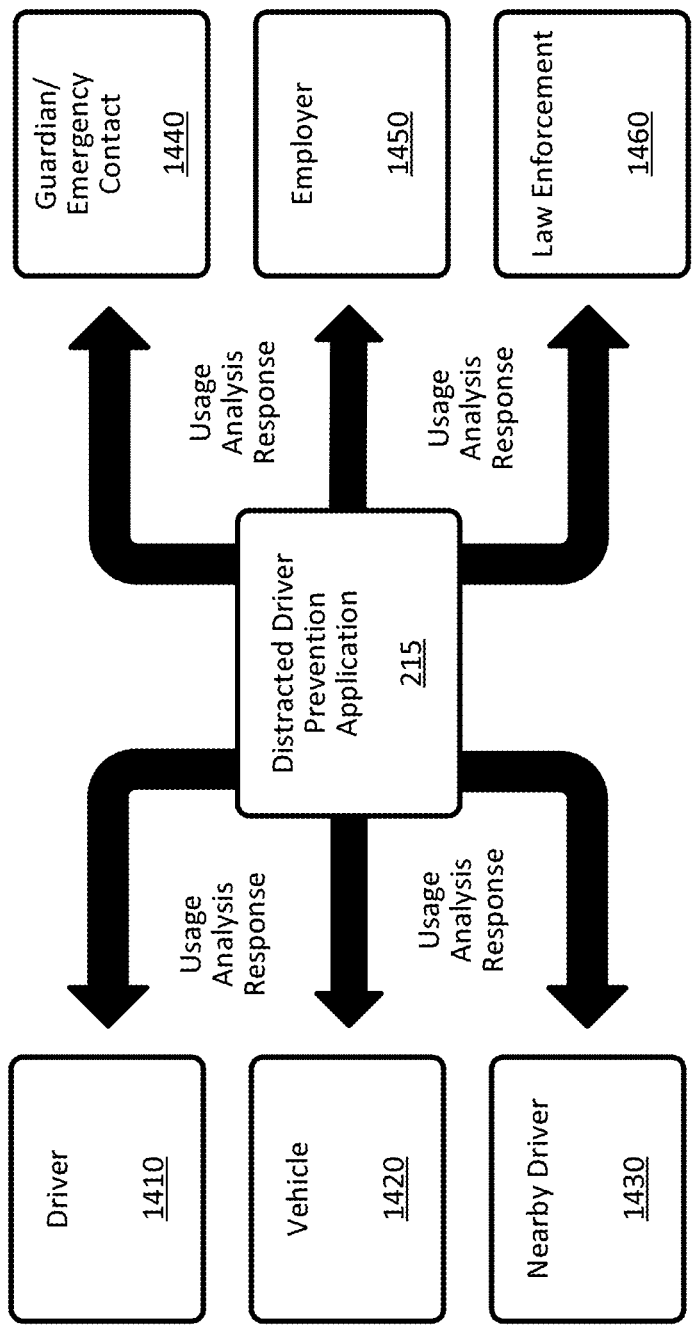
FIG. 14 illustrates an example implementation for responding to a usage data analysis.

FIG. 14 illustrates an example implementation for responding to a usage data analysis. As shown user device 210 may respond to a usage data analysis by communicating a driving analysis response to one or more entities (e.g., driver 1410 (e.g., the user of user device 215), vehicle 1420, nearby driver 1430, guardian/emergency contact 1440, employer 1450, law enforcement 860, etc.). A usage data analysis response may include one or more types of operations, such as alerting driver 1410 with an audio signal, reporting usage data and or a determination that driver 1410 is distracted to diagnostics device 230 of vehicle 1420, activating assisted driving feature of vehicle 1420, communicating to vehicle 1420 to activate a braking system of vehicle 1420, activating a radio or other media device of vehicle 1420, communicating a warning to one or more nearby drivers 1430, contacting guardian/emergency contact 1440 of driver 1410, notifying employer 1450 that driver 1410 is driving while distracted by user device 210, notifying law enforcement 1460 that driver 1410 is driving while distracted by user device 210, etc. Depending on the implementation, a usage data analysis response may include one or more types of communications, such as an audio signal, a telephone call, a text message, an email, a voicemail, a log file, etc. Additionally, or alternatively, a usage data analysis response may include one or more types of information, such as an alarm, pre-recorded audio signal, a written message, a description of the geographic location of vehicle 1420, etc.

In some implementations, a usage data analysis response may include enabling a guardian, employer, or other entity to contact driver 1410 and/or vehicle 1420. Doing so may enable guardian 1440, employer 1450, or law enforcement 1460 to, for example, speak with driver 1410 to verify whether driver 1410 is distracted, to convince driver 1410 to pull over or drive to a rest stop, etc. Additionally, or alternatively, doing so may enable guardian 1440, employer 1450, or law enforcement 1460 to exercise control over vehicle 1420 to, for example, activate the braking system of vehicle 1420, turn off the engine of vehicle 1420, etc. As such, distracted driver prevention application 215 may enable user device 210 to respond to a usage data analysis in one or more of a large variety of ways to prevent a driver from driving while distracted by user device 210. In some implementations, communications between the driver and user device 210 in a manner that does not cause further distraction on the part of the driver from driving.

As described above, FIGS. 4-14 provide example implementations of operations shown in FIG. 3. It should be noted, however, that while FIG. 3 shows a flowchart diagram of an example process 300 for preventing a user from driving while distracted, in other implementations, a process for preventing a user from driving while distracted may include fewer operations, different operations, differently arranged operations, and/or additional operations than depicted in FIG. 3. For instance, in implementations where user device 210 disables one or more features of user device 210 to prevent the user from being distracted, user device 210 continue to monitor the movements of user device 210 and/or re-enable the disabled features of user device 210 upon determining that the user is no longer driving the vehicle. In addition, while FIGS. 4-14 show example implementations with various features, in other implementations, example implementations may include fewer features, different features, differently arranged features, and/or additional features than the features depicted in FIGS. 4-14.

Figure 15:
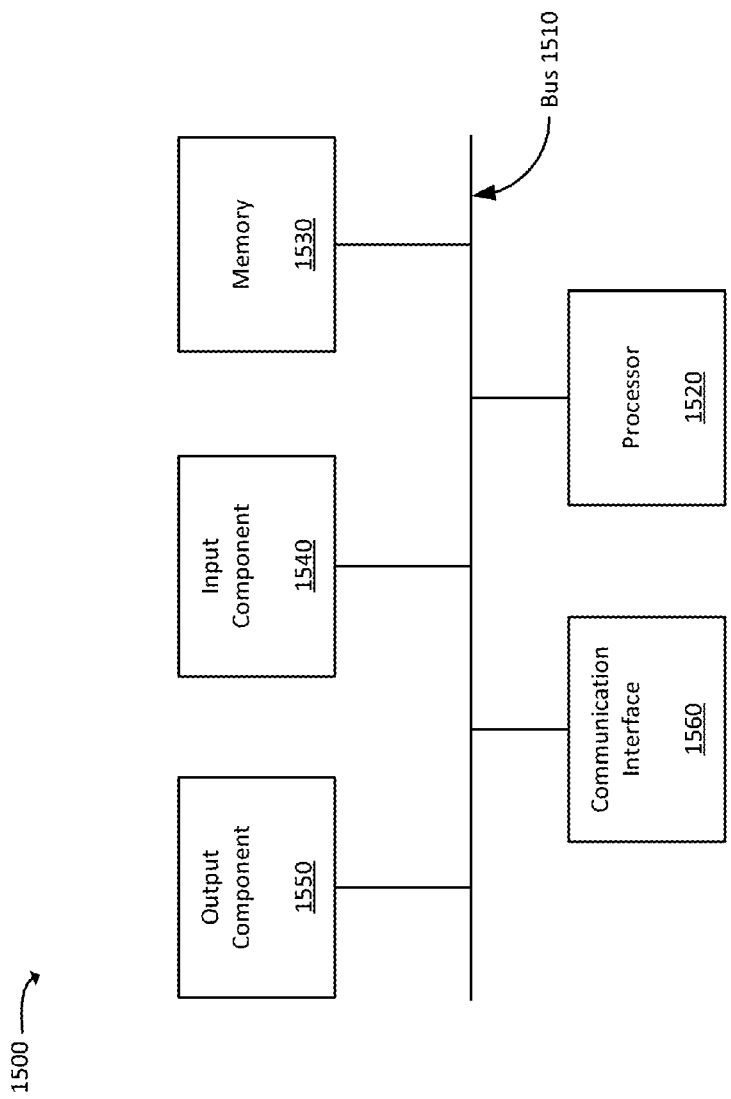
FIG. 15 illustrates example components of one or more devices, according to one or more implementations described herein.

FIG. 15 is a diagram of example components of device 1500. One or more of the devices described above (e.g., with respect to FIGS. 1, 2, and 5-12) may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes (LEDs), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device.

A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or simila terms), as used herein to describe a relationship of a value to a threshold may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms), As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is sed.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   collecting, by a mobile device, usage data that is indicative of whether a user, of the mobile device, is looking at the mobile device;
   determining, by the mobile device, whether the user is driving a vehicle by:
      determining whether the user is located in a driver's seat of the vehicle, the determining of whether the user is located in the driver's seat of the vehicle comprising:
         collecting first image data of an environment surrounding the user device,
         comparing the first image data to second image data that includes one or more images consistent with the user being located in the driver's seat,
         communicating with a diagnostics device of the vehicle to determine a distance between the diagnostics device and the mobile device,
         comparing the distance to a threshold distance, and
         determining, based on the comparing of the first image data to the second image data and the comparing of the distance to the threshold distance, whether the user is located in the driver's seat; and
   analyzing, by the mobile device and when it is determined that the user is driving the vehicle, the usage data to determine whether the driver is distracted by the mobile device itself by comparing the usage data to a distraction threshold; and
   when it is determined that the driver is distracted by the mobile device while driving the vehicle, disabling, by the mobile device, a feature of the mobile device to prevent the user from being distracted by the mobile device.

2. The method of claim 1, wherein the usage data comprises at least one of:
   information communicated between the mobile device and a network to which the mobile device is connected,
   information communicated between the mobile device and the user of the mobile device, or
   at least one internal process performed by the mobile device.

3. The method of claim 1, wherein the usage data comprises an orientation of the mobile device in conjunction with image data collected by the mobile device of the user looking at a display of the mobile device.

4. The method of claim 3, wherein the orientation of the mobile device is determined by the mobile device based on information from an accelerometer of the mobile device and at least one of:
   information from a front-side camera, or
   information from a back-side camera of the mobile device.

5. The method of claim 1, wherein the first image data comprises at least one of:
   a seat belt of the vehicle,
   a steering wheel of the vehicle;
   a feature of a driver console of the vehicle,
   a gear shifter of the vehicle,
   a center console of the vehicle
   a glove compartment of the vehicle,
   a rearview mirror of the vehicle,
   a back seat of the vehicle,
   a front seat of the vehicle,
   a window of the vehicle, or
   a passenger within the vehicle.

6. The method of claim 1, wherein:
   when the vehicle is not moving for a period of time, determine whether the user is driving, by:
      determining whether the user is located in a driver's seat of the vehicle, and
      determining whether the vehicle is stopped at a traffic light or in a traffic jam.

7. The method of claim 1, further comprising:
   generating a user profile based on the profile information received from the user and profile information received from an application server, the profile information from the application server comprising profile information corresponding to at least one user that is analogous to the user,
   wherein the analyzing of the usage data is based on the user profile.

8. The method of claim 1, where the analyzing of the usage data to determine whether the driver is distracted by the mobile device comprises determining whether the usage data exceeds a distraction threshold within a pre-selected time interval.

9. The method of claim 1, further comprising:
   defining the distraction threshold based on at least one of:
      a user profile associated with the user of the mobile device,
      stored information indicating whether the user has a propensity for being distracted by the mobile device while driving,
      comparing a time, a duration, or a route, to information identifying a time, duration, or route where the user has been distracted by the mobile device previously,
      comparing a time, a duration, or a route, to information identifying a time, duration, or route where an—analogous user has been distracted by another mobile device previously,
      a type of media that is being played in the vehicle,
      an orientation of the mobile device,
      comparing a type of information being communicated, by the mobile device and to a wireless telecommunication network, to another type of information that was previously communicated, by the mobile device and to the wireless telecommunication network, and that is associated with the user being distracted by the mobile device previously, comparing a type of information recently received, by the mobile device and from the wireless telecommunication network, to another type of information that was previously received, by the mobile device and from the wireless telecommunication network, and that is associated with the user being distracted by the mobile device, comparing a type of information recently communicated, by the mobile device and to the user, to another type of information that was previously communicated, by the mobile device and to the user, and that is associated with the user being distracted by the mobile device, or comparing a type of information recently received, by the mobile device and from the user, to another type of information that was previously received, by the mobile device and from the user, and that is associated with the user being distracted by the mobile device previously.

10. The method of claim 1, comprising least one of:
communicating the usage data to a diagnostics device of the vehicle,
communicating an instance of distraction to the diagnostics device of the vehicle,
producing an audio signal to notify the user to not use the mobile device while driving,
requesting the vehicle to activate a braking system of the vehicle,
requesting the vehicle to turn off an engine of the vehicle,
requesting the vehicle to activate an automated driving feature of the vehicle,
warning drivers of other vehicles that the user is distracted by the mobile device,
contacting a guardian of the user about the driving being distracted by the mobile device,
contacting an employer of the user about the driving being distracted by the mobile device, or
contacting local law enforcement about the user being distracted by the mobile device.

11. The method of claim 1, further comprising:
subsequently enabling the disabled feature of the mobile device upon determining that the user is no longer driving the vehicle.

12. A system, comprising:
a mobile device, comprising:
a non-transitory memory device storing:
a plurality of processor-executable instructions; and
a processor configured to execute the processor-executable instructions, wherein executing the processor-executable instructions causes the processor to:
collect usage data that is indicative of whether a user, of the mobile device, is looking at the mobile device,
determine whether the user is driving a vehicle by:
determining whether the user is located in a driver's seat of the vehicle, the determining of whether the user is located in the driver's seat of the vehicle comprising:
collecting first image data of an environment surrounding the user device,
comparing the first image data to second image data that includes one or more images consistent with the user being located in the driver's seat,
communicating with a diagnostics device of the vehicle to determine a distance between the diagnostics device and the mobile device,
comparing the distance to a threshold distance, and
determining, based on the comparing of the first image data to the second image data and the comparing of the distance to the threshold distance, whether the user is located in the driver's seat; and
analyze, when it is determined that the user is driving the vehicle, the usage data to determine whether the driver is distracted by the mobile device itself by comparing the usage data to a distraction threshold, and
when it is determined that the driver is distracted by the mobile device while driving the vehicle, disable a feature of the mobile device to prevent the user from being distracted by the mobile device while driving.

13. The system of claim 12, wherein executing the processor-executable instructions causes the processor to:
define the distraction threshold based on at least one of:
a user profile associated with the user of the mobile device,
stored information indicating whether the user has a propensity for being distracted by the mobile device while driving,
comparing a time, a duration, or a route, to information identifying a time, duration, or route where the user has been distracted by the mobile device previously,
comparing a time, a duration, or a route, along which the vehicle is moving, to information identifying a time, duration, or route where an analogous user has been distracted by another mobile device previously,
a type of media that is being played in the vehicle,
an orientation of the mobile device,
comparing a type of information being communicated, by the mobile device and to a wireless telecommunication network, to another type of information that was previously communicated, by the mobile device and to the wireless telecommunication network, and that is associated with the user being distracted by the mobile device previously,
comparing a type of information recently received, by the mobile device and from the wireless telecommunication network, to another type of information that was previously received, by the mobile device and from the wireless telecommunication network, and that is associated with the user being distracted by the mobile device,
comparing a type of information recently communicated, by the mobile device and to the user, to another type of information that was previously communicated, by the mobile device and to the user, and that is associated with the user being distracted by the mobile device, or
comparing a type of information recently received, by the mobile device and from the user, to another type of information that was previously received, by the mobile device and from the user, and that is associated with the user being distracted by the mobile device previously.

14. The system of claim 12, wherein executing the processor-executable instructions causes the processor to perform at least one of the following:
communicate the usage data to a diagnostics device of the vehicle, communicate an instance of distraction to the diagnostics device of the vehicle, produce an audio signal to notify the user to not use the mobile device while driving, request the vehicle to activate a braking system of the vehicle, request the vehicle to turn off an engine of the vehicle, request the vehicle to activate an automated driving feature of the vehicle, warn drivers of other vehicles that the user is distracted by the mobile device while driving, contact a guardian of the user about the driving while being distracted by the mobile device, contact an employer of the user about the driving while being distracted by the mobile device, or contact local law enforcement about the user being distracted by the mobile device.

15. The system of claim 12, wherein the usage data comprises:

an orientation of the mobile device, and image data collected by the mobile device of the user looking at a display of the mobile device.

16. The system of claim 15, wherein the orientation of the mobile device is determined by the mobile device based on information from an accelerometer of the mobile device and at least one of:

information from a front-side camera, or information from a back-side camera of the mobile device.

17. The system of claim 12, wherein executing the processor-executable instructions causes the processor to:

when the vehicle is not moving, determine whether the user is driving, by:

determining whether the user is located in a driver's seat of the vehicle, and determining whether the vehicle is stopped at a traffic light or in a traffic jam.

18. A non-transitory computer-readable medium storing instructions, the instructions comprising:

a plurality of instructions which, when executed by one or more processors associated with a device, cause the one or more processors to:

generate a user profile, the user profile comprising instructions for a mobile device to prevent a user from driving a vehicle while distracted by the mobile device, collect usage data that is indicative of whether a user, of the mobile device, is looking at the mobile device, determine whether the user is driving a vehicle by:

determining whether the user is located in a driver's seat of the vehicle, the determining of whether the user is located in the driver's seat of the vehicle comprising:

collecting first image data of an environment surrounding the user device, comparing the first image data to second image data that includes one or more images consistent with the user being located in the driver's seat, communicating with a diagnostics device of the vehicle to determine a distance between the diagnostics device and the mobile device, comparing the distance to a threshold distance, and determining, based on the comparing of the first image data to the second image data and the comparing of the distance to the threshold distance, whether the user is located in the driver's seat; and analyze, when it is determined that the user is driving the vehicle, the usage data to determine whether the driver is distracted by the mobile device itself by comparing the usage data to a distraction threshold, when it is determined that the driver is distracted by the mobile device while driving the vehicle, disable a feature of the mobile device, in accordance with the instructions of the user profile, to prevent the user from being distracted by the mobile device while driving, monitor movements of the mobile device after disabling the feature of the mobile device, and enable the disabled feature of the mobile device upon determining that, based on the monitored movements of the mobile device, the user is no longer driving the vehicle.

19. The non-transitory computer-readable medium of claim 18, wherein the plurality of instructions cause the one or more processors to:

define the distraction threshold based on at least one of:

a user profile associated with the user of the mobile device, stored information indicating whether the user has a propensity for being distracted by the mobile device while driving, comparing a time, a duration, or a route, along which the vehicle is moving, to information identifying a time, duration, or route where the user has been distracted by the mobile device previously, comparing a time, a duration, or a route, along which the vehicle is moving, to information identifying a time, duration, or route where an analogous user has been distracted by another mobile device previously, a type of media that is being played in the vehicle, an orientation of the mobile device, comparing a type of information being communicated, by the mobile device and to a wireless telecommunication network, to another type of information that was previously communicated, by the mobile device and to the wireless telecommunication network, and that is associated with the user being distracted by the mobile device previously, comparing a type of information recently received, by the mobile device and from the wireless telecommunication network, to another type of information that was previously received, by the mobile device and from the wireless telecommunication network, and that is associated with the user being distracted by the mobile device, comparing a type of information recently communicated, by the mobile device and to the user, to another type of information that was previously communicated, by the mobile device and to the user, and that is associated with the user being distracted by the mobile device, or comparing a type of information recently received, by the mobile device and from the user, to another type of information that was previously received, by the mobile device and from the user, and that is associated with the user being distracted by the mobile device previously.

20. The non-transitory computer-readable medium of claim 18, wherein the plurality of instructions cause the one or more processors to:

communicate the usage data to a diagnostics device of the vehicle, communicate an instance of distraction to the diagnostics device of the vehicle, produce an audio signal to notify the user to not use the mobile device while driving, request the vehicle to activate a braking system of the vehicle, request with the vehicle to turn off an engine of the vehicle, request the vehicle to activate an automated driving feature of the vehicle, warn drivers of other vehicles that the user is distracted by the mobile device while driving, contact a guardian of the user about the driving while being distracted by the mobile device, contact an employer of the user about the driving while being distracted by the mobile device, or contact local law enforcement about the user being distracted by the mobile device.

* * * * *